May 5, 1942.　　　C. T. LANGMAID　　　2,281,700
FASTENING DEVICE
Filed May 13, 1941
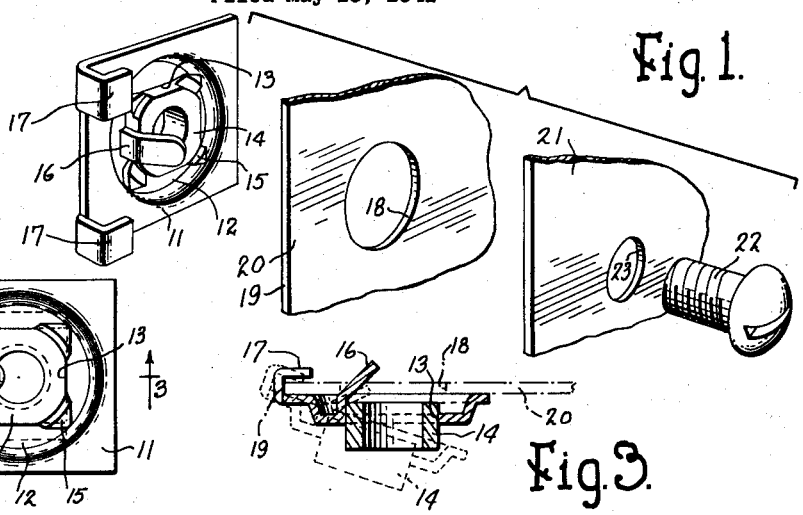
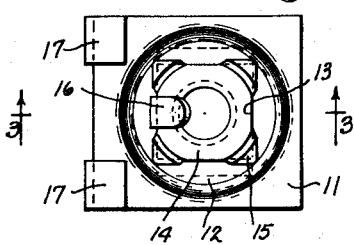
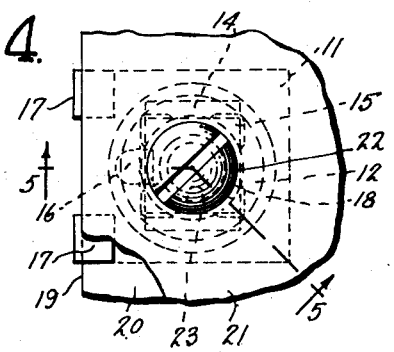
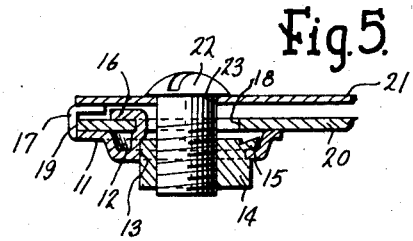
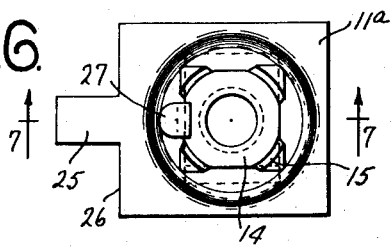
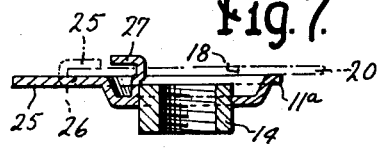
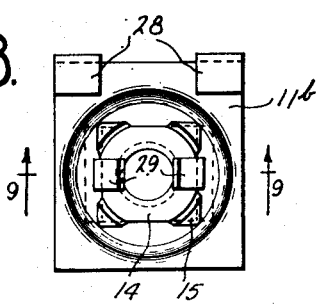
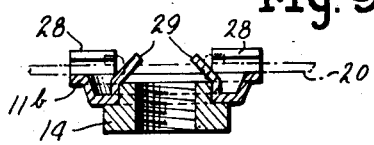
INVENTOR.
Charles T. Langmaid
BY Edward M. Apple
Attorney Patented May 5, 1942

2,281,700

UNITED STATES PATENT OFFICE 2,281,700

FASTENING DEVICE

Charles T. Langmaid, Detroit, Mich.

Application May 13, 1941, Serial No. 393,276

4 Claims. (Cl. 85—32)

This invention relates to fastening devices and particularly to a clip for securing clinch-on nuts to other objects preparatory to the final assembly of major parts.

Such devices have wide application in the automotive industry where it is necessary to fasten together various parts by means of threaded elements. In many instances the metal of a member is not thick enough to provide sufficient thread area to insure security. In these instances it is common practice to attach a clinch-on nut to such members, so that other elements may be attached thereto with bolts.

Many ways have been devised for holding the clinch-on nuts in position prior to threading the bolts into them.

It is, therefore, an object of this invention to provide an improved means for initially holding the clinch-on nuts.

In the accompanying drawing, I have shown one embodiment of my invention.

In this drawing:

Fig. 1 is a perspective view of my device, together with a fragmentary portion of an apertured member, to which a second apertured member is to be secured by the bolt shown.

Fig. 2 is a plan view of the device illustrated in Fig. 1.

Fig. 3 is a section taken on the line 3—3 of Fig. 2, with lines dotted in to show the relative position of the device, with reference to the apertured plate shown in Fig. 1, during the initial operation of positioning the device on the apertured plate.

Fig. 4 is a plan view of the parts shown in Fig. 1, after they are assembled.

Fig. 5 is a section taken substantially on the line 5—5 of Fig. 4.

Fig. 6 is a modified form of my device.

Fig. 7 is a section taken substantially on the line 7—7 of Fig. 6.

Fig. 8 is another modified form of my device.

Fig. 9 is a section taken substantially on the line 9—9 of Fig. 8.

Referring now more particularly to the drawing, it will be seen that in the embodiment shown in Fig. 1, my improved fastening device consists of a clip 11, having a cup-like depression 12, formed with an aperture 13, in which is fixed a clinch-on nut 14, the latter being clinched as at 15.

The clip 11 is stamped with an integral tongue 16, which comprises some of the stock taken from the body of the clip in making the aperture 13. The tongue 16 is bent upwardly and extends along the side of the nut 14, and then is rebent as shown in Fig. 1. The clip 11 is also formed with integral ears 17, which are bent and rebent as shown in Fig. 1. The tongue 16 is intended to be extended through the aperture 18 formed near the edge 19 of the plate or panel 20, and the ears 17 are adapted to engage the outer edge 19 of the plate or panel 20. The tongue 16 is then bent toward the edge 19 of the plate or panel 20 as shown in Figs. 4 and 5, after which the member 21 may be attached by inserting the bolt 22 through the aperture 23 in the member 21, and into the threaded area of the nut 14.

One of the features of the preferred embodiment of my improved clip is that it automatically centers the nut 14 in the aperture 18 of the plate or panel 20, because of the tendency of the tongue 16 to seek a position on the inside of the aperture 18 equally distant from the two ears 17.

In Figs. 6 and 7, I show a modified form of clip 11a in which there is but one ear 25 positioned near the center of the edge 26 directly opposite the tongue 27.

In Figs. 8 and 9, I show another modified form of clip 11b in which the ears 28 are positioned in the same place on the clip as shown in the preferred forms (Figs. 1 to 5), but in this embodiment there are two tongues 29 instead of one and they are placed in oppositely disposed positions with reference to each other and are not formed adjacent the edge carrying the ears 28 as in the previous illustrations.

Although I have illustrated certain embodiments of my invention, it will be understood that other modifications may be made, all of which are intended to be within the scope of the appended claims.

Having described my invention, what I claim and desire to secure by Letters Patent is:

1. A fastener comprising a length of metal having an aperture therein and a nut secured in said aperture, by displacing some of the nut body against the walls of the aperture, there being a tongue formed adjacent said aperture by some of the material removed in forming said aperture, said tongue being bent away from its original plane, and being adapted to be extended through an aperture in another member to which it is to be secured.

2. The combination with an apertured panel, of a fastener comprising a substantially rectangular member having an aperture therein, a tongue formed thereon and extending through the apertured panel, and bent over the same, there being a clinch-on nut secured in the aperture of said rectangular member, by displacing some of the nut body against the walls of the aperture of said rectangular member.

3. The combination defined in claim 2, including ears formed along the edge of said rectangular member and bent over the edge of said apertured panel.

4. The combination defined in claim 2, in which the apertures of the said panel, and said rectangular member are held in alignment, by the co-operation of the said tongue and one or more ears formed on said rectangular member.

CHARLES T. LANGMAID.